(12) United States Patent  (10) Patent No.: US 9,058,623 B2
Gindi et al.  (45) Date of Patent: Jun. 16, 2015

(54) SEMANTIC TAGGED ADS

(75) Inventors: Moti Gindi, Tel-Aviv (IL); Kfir Karmon, Petach Tikva (IL); Haim Somech, Ramat Gan (IL)

(73) Assignee: Microsoft Corporation, Redmond, WA (US)

( * ) Notice: Subject to any disclaimer, the term of this patent is extended or adjusted under 35 U.S.C. 154(b) by 71 days.

(21) Appl. No.: 13/287,127

(22) Filed: Nov. 2, 2011

(65) Prior Publication Data

US 2013/0110647 A1    May 2, 2013

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0601* (2013.01); *G06Q 30/0277* (2013.01); *G06Q 30/0613* (2013.01); *G06Q 30/0241* (2013.01)

(58) Field of Classification Search
USPC ...................................... 705/14.73
See application file for complete search history.

(56) References Cited

U.S. PATENT DOCUMENTS

| | | | |
|---|---|---|---|
| 5,999,912 A | 12/1999 | Wodarz et al. | |
| 6,591,271 B1 * | 7/2003 | Ceri et al. | 1/1 |
| 6,625,581 B1 * | 9/2003 | Perkowski | 705/27.1 |
| 7,900,225 B2 | 3/2011 | Lyon et al. | |
| 7,912,868 B2 | 3/2011 | Calistri-Yeh et al. | |
| 2007/0061204 A1 | 3/2007 | Ellis et al. | |
| 2007/0192164 A1 | 8/2007 | Nong et al. | |
| 2008/0147487 A1 | 6/2008 | Hirshberg | |
| 2009/0037257 A1 * | 2/2009 | Stuckey et al. | 705/10 |
| 2010/0268596 A1 | 10/2010 | Wissner et al. | |

OTHER PUBLICATIONS

Shridish, "Replacing html tags in servlet code with a html file name", blog post from Feb. 2003, found on line at www.coderanch.com/t/355981/Servlets/java/Replacing-html-tags-servlet-code.*
Mirizzi, et al., "Semantic tags generation and retrieval for online advertising", Retrieved at <<http://sisinflab.poliba.it/publications/2010/MRDD10f/cikm1084-mirizzi.pdf>>, CIKM, Oct. 26-30, 2010, pp. 10.
Thomas, et al., "Semantic Advertising for Web 3.0", <<Retrieved at http://www.abdn.ac.uk/~csc280/pub1TPTJ*09.pdf>>, Retrieved Date: May 5, 2011, pp. 10.

(Continued)

*Primary Examiner* — John G Weiss
*Assistant Examiner* — Scott C Anderson
(74) *Attorney, Agent, or Firm* — Sandy Swain; Judy Yee; Micky Minhas

(57) ABSTRACT

A scraping mechanism may download a web page from a retailer and extract information for each item being offered for sale. The scraping mechanism may parse the published HTML code to identify items for sale, along with other parameters that may be presented in the web page. From the web page, a data structure may be created that represents the items for sale, and the data structure may be used to generate advertisements for the retailer, add the items to a search engine, or for other uses. In some embodiments, the retailer may include hints, tags, or other annotations in the HTML code to facilitate the data capture. The web page may be a standard public page or may be a private page accessible to the scraping mechanism only.

20 Claims, 5 Drawing Sheets

(56) References Cited

OTHER PUBLICATIONS

"Semantic technology brings new relevance to ads", Retrieved at <<http://emediavitals.com/content/semantic-technology-brings-new-relevance-ads>>, Retrieved Date: May 5, 2011, pp. 2.

Broder, et al., "A Semantic Approach to Contextual Advertising", Retrieved at <<http://citeseerx.ist.psu.edu/viewdoc/download?doi=10.1.1.98.2553&rep=rep1&type=pdf>>, Proceedings of the 30th annual international ACM SIGIR conference on Research and development in information retrieval, Jul. 23-27, 2007, pp. 8.

* cited by examiner

EXAMPLE WEB PAGES
200

SEMANTIC TAGGED ADS

BACKGROUND

Many search engines and online retail aggregators populate databases of advertisements by receiving descriptions of all the products the online retailer has for sale. This operation puts the burden on the online retailer to make the data available in formats that the search engines or retail aggregators may use. Such a burden is costly for the retailer and may have to be duplicated for each search engine and retail aggregator that the retailer may desire to use. In many cases, the retailer's data may change often, such as when price changes occur or when inventory levels change.

SUMMARY

A scraping mechanism may download a web page from a retailer and extract information for each item being offered for sale. The scraping mechanism may parse the published HTML code to identify items for sale, along with other parameters that may be presented in the web page. From the web page, a data structure may be created that represents the items for sale, and the data structure may be used to generate advertisements for the retailer, add the items to a search engine, or for other uses. In some embodiments, the retailer may include hints, tags, or other annotations in the HTML code to facilitate the data capture. The web page may be a standard public page or may be a private page accessible to the scraping mechanism only.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
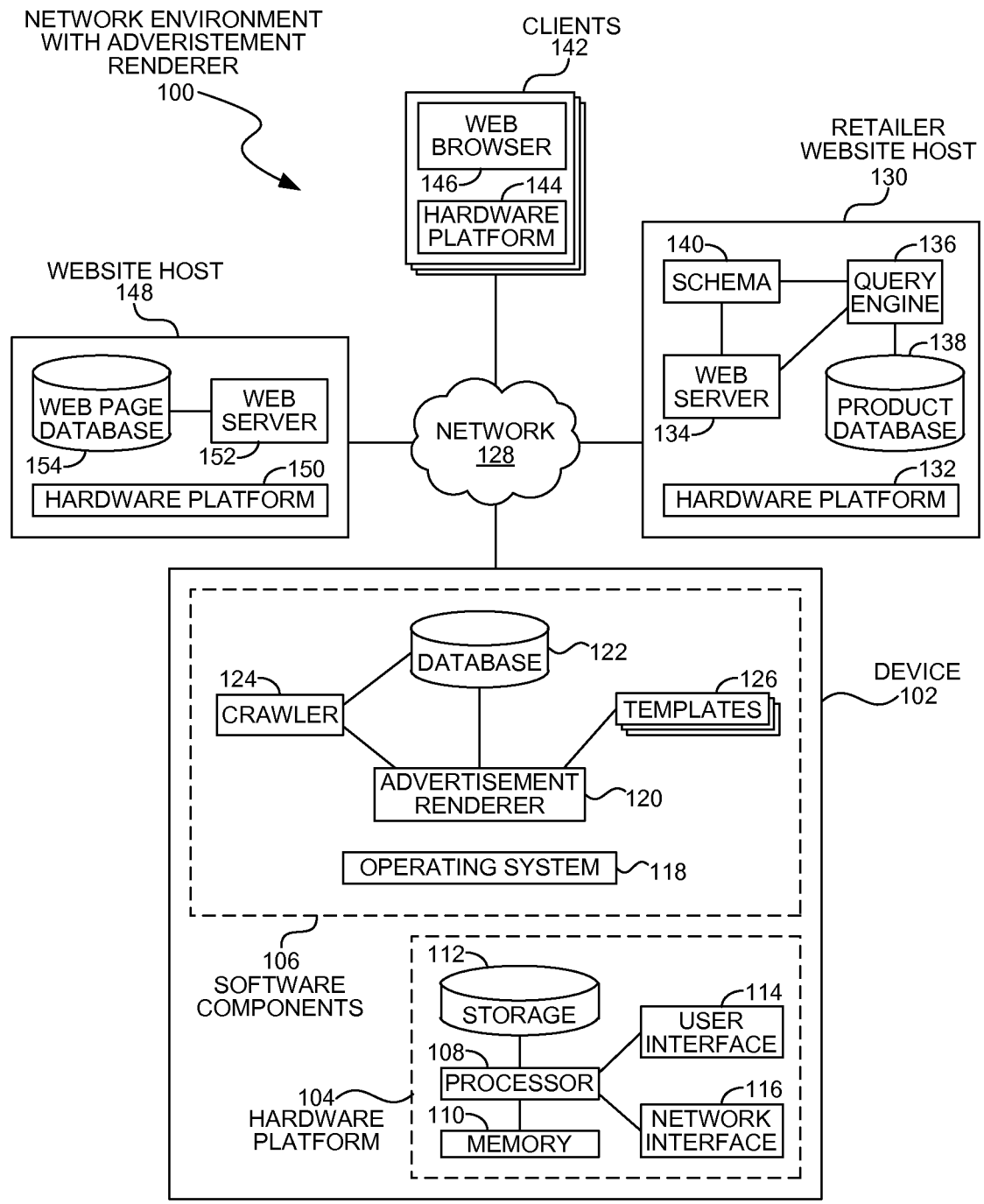
FIG. 1 is a diagram of an embodiment showing a network environment with an advertisement management system.

A seller may tag their advertisements within a web page so that a scraping mechanism may identify items for sale and present those items on another web page. The seller may make their products available without having to provide access to the seller's database or other complex interaction.

A scraping mechanism may load a seller's web page containing the items for sale, and identify those items by the tags placed on the items. The items may be displayed on another website and linked back to the seller's website.

The scraping mechanism may enable aggregators, website properties, and other websites to have up-to-date information from a seller for various products. The aggregators may use the scraping mechanism to offer similar items or related items when a user browses to a certain item. Other uses may include reconfiguring a seller's advertisements to be displayed as part of another website where the seller pays for the advertisement space, where the seller pays for each click on the advertisement, or some other business model.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing a device 102 that may scrape data from retailer websites, then use that data to provide advertisements or other links to the website. Embodiment 100 is a simplified example of an ecosystem that manages advertisements.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning tong distances. Each embodiment may use different hardware, software, and interconnection architectures to achieve the described functions.

Embodiment 100 illustrates a system where an advertisement system may scrape items for sale from a retailer website and present those items for sale in other websites. The advertisement system may gather items from a web retailer's website by crawling the website and identifying items tagged within the Hyper Text Markup Language (HTML) code used to render the retailer's web page. In some cases, the retailer may identify items using a scripting language, such as Javascript, where the items may be stored in a browser's memory. Some embodiments may download data from the retailer's database to render in the retailer's website.

The tags embedded in the HTML of the retailer's web page may follow a schema that may define the properties associated with items for sate. The tags may identify an item, as well as data that may be relevant to the item. For example, a set of tags may identify a particular item, as well as the cost, inventory level, available sizes and colors, or other information.

The schema may be used to store items and item properties in a database. The database may then be used to generate advertisements for the retailer. In some embodiments, the retailer's website may be crawled or queried on demand to supplement or eliminate a stored database of items for sale.

The embedded tags may be placed in the HTML by an automated system that generates web pages for the retailer. The retailer's system may embed tags whenever a web page is created and displayed, so that the crawler may access the same web pages that the retailer uses to display their information.

The advertisement system may place advertisements or other content in various web pages under contract with the retailer. In many cases, the advertisements may be items such as banner ads and the like that may be placed on weblogs, news aggregators, games, or whatever type of website. In many cases, the websites that host the advertisement may be paid by the advertisement company to allow the advertisements to be placed on the websites.

The advertisement company may have several different layouts or templates for advertisements. An advertisement may be placed in banners that are wider than they are tall, or in other formats that may be square or that may be taller than they may be wide. The advertisements may be formatted to be displayed on a personal computer browser, a mobile device such as a cellular telephone, a game console, public billboard, or any other device with a display that may be capable of showing an advertisement.

With each layout for an advertisement or different display device, the advertisement company may use a different template to format and present the advertisement. The template may define the placement of items within the advertisement, as well as 'look and feel' of the advertisement.

In many embodiments, the advertisement system may crawl a retailer's website to gather both the items for sale as well as the 'look and feel' of the retailer's website. The look and feel may be defined by the color palette, font selection, item spacing, text size and formatting, logos, images, and other items. These items may be detected from the retailer's website and used by the advertisement company to create new advertisements based on the retailer's web pages. In some embodiments, these items may be identified by tags so that the advertisement system may identify and use the items.

The advertisement system may call much, if not all, of the information used to create advertisements from the retailer's existing web pages, when those web pages are annotated using tags. Such a system may allow an advertisement company to engage the retailer without having the retailer do any extra work, such as making their database of items for sale available through another avenue.

The tagging schema may be a standardized schema that may be used by multiple retailers. In such embodiments, the tagging schema may be defined by the advertisement company as a condition for doing business with the advertisement company. In some cases, the advertisement company may provide a discount when the retailers comply with the schema. Some embodiments may use a standardized schema that may be common to many advertisement companies and may serve as an industry or trade group standard.

In some embodiments, the tagging schema may be defined by the retailer and the tagging schema may change from one retailer to another. In such embodiments, the schema may be defined in a file that may be downloaded from the retailer. For example, a retailer may embed a link to the schema in a webpage so that the advertisement system may retrieve the retailer's schema. In some embodiments, there may not be an expressly defined schema. In such embodiments, a schema may be implied by examining the tags and creating a schema from the tags.

Some embodiments may have certain portions of the schema defined by the advertisement company or industry consortium, while other portions of the schema defined by the retailer. Such embodiments may have a generic portion of the schema defined by an industry standard, but extensions to the schema for retailer-specific items may be defined by the retailers.

The system of embodiment 100 is illustrated as being contained in a single device 102. The device 102 may have a hardware platform 104 and software components 106.

The device 102 may represent a server or other powerful computer system. In some embodiments, however, the device 102 may be any type of computing device, such as a personal computer, game console, cellular telephone, netbook computer, or other computing device. Some embodiments may use a group of devices to implement the functions of the device 102. For example, the device 102 may be implemented within a datacenter where the hardware platform 104 comprises many computer devices and the software component are implemented as stateless or stateful processes that operate on the hardware platform.

The hardware platform 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware platform 104 may include user interface devices 114. The user interface devices 114 may include keyboards, monitors, pointing devices, and other user interface components.

The hardware platform 104 may also include a network interface 116. The network interface 116 may include hardwired and wireless interfaces through which the system 102 may communicate with other devices.

Many embodiments may implement the various software components using a hardware platform that is a cloud fabric. A cloud hardware fabric may execute software on multiple devices using various virtualization techniques. The cloud fabric may include hardware and software components that may operate multiple instances of an application or process in parallel. Such embodiments may have scalable throughput by implementing multiple parallel processes.

The software components 106 may include an operating system 118 on which various applications may execute. In some cloud based embodiments, the notion of an operating system 118 may or may not be exposed to an application.

An advertisement renderer 1120 may provide advertisements that may be included in various websites. The advertisements may be created from data in a database 122 that was created by a crawler 124. The crawler 124 may crawl a retailer's website to identify items for sale that are tagged. The tags may define a schema that may be used to store the items for sale and properties of those items in the database 122.

In some embodiments, the crawler 124 may retrieve layout information and 'look and feel' information from a retailer's website so that any advertisements created by the advertisement renderer 120 may have the same 'look and feel' as the retailer's website.

In many embodiments, the advertisement renderer 1120 may use various templates 126 to construct an advertisement. The templates 126 may define different types of advertisements, such as banner ads, column ads, search result ads, shopping aggregator ads, or other advertisements.

The device 102 may be connected via a network 128 to various other devices. The network 128 may be a local area network, wide area network, the Internet, or other network. The network 128 may be hardwired, wireless, or a combination of hardwired and wireless networks.

A retailer website host 130 may serve web pages from a retailer. The host 130 may include a hardware platform 132 on which a web server 134 may operate. The web server 134 may use a query engine 136 to retrieve items for sale from a product database 138.

The web server 134 may generate web pages that display products for sale. The web pages may be category or other pages that may include multiple products for sale, as well as single product pages that focus on a single item for sale. In many cases, the web pages that include many products for sale may display a subset of properties or information about the products, while the single pages may include additional properties and display more details about the product.

The web server 134 may use a schema 140 that may be used to include tags in the HTML code served by the web server 134. The tags may be embedded in the HTML so that automated systems, such as the crawler 124, may identify items for sale and any properties associated with those items. The tagged elements may be used by an advertisement renderer 120 to create advertisements that include the items for sale.

Various clients 142 may be used to access the retailer's web pages or other web pages. The clients 142 may have a hardware platform 144 on which a browser 146 may operate. The browser 146 may transmit a request for a web page to a web server, which may return an HTML file, and the browser 146 may render the HTML file to be visible to a user.

A website host 148 may provide web pages for various clients 142. The website host 148 may operate on a hardware platform 150 and may have a web server 152 that serves web pages taken from a web page database 154.

In many cases, a web page served by the website host 148 may include an HTML reference to the device 102 for an advertisement. In such a case, a website may be an HTML file that is transmitted to a client 142 and an advertisement provided by the advertisement renderer 120 may be displayed as part of the rendered HTML file.

Figure 2A:
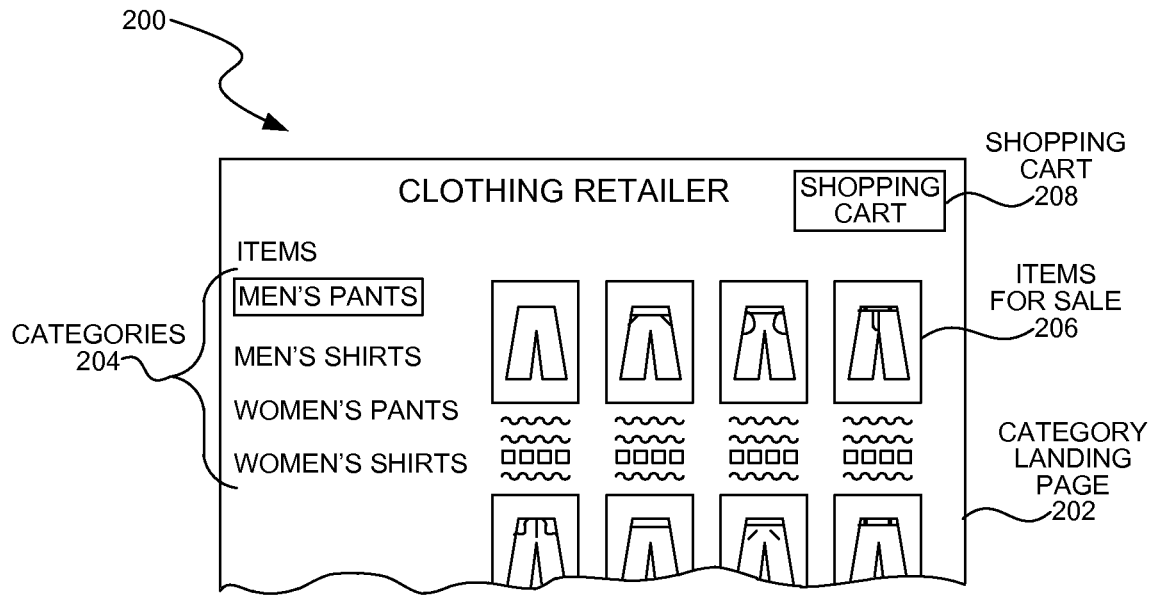
FIG. 2A is a diagram illustration an example embodiment showing a category landing page for a retailer.

FIG. 2A is a schematic illustration of an example embodiment 202 showing a category landing page. The landing page may display multiple items for sale, each of which may be tagged so that a crawler may be able to identify the items and any related properties.

The landing page 202 may have a set of categories 204, for example, where a user may select an entire category of items to browse. The various items for sale 206 may each be displayed in a separate area. The items for sale 206 may have an image, description, and possibly various options.

In the example of page 202, a clothing retailer may be displaying a selection of men's pants for sale. Each type or style of pants may be shown, and a user may be able to purchase directly from page 202, or may be directed to a single item page to select the specific color, size, and other options. When a user selects a pair of pants, the pants may be added to the shopping cart 208.

Figure 2B:
FIG. 2B is a diagram illustration an example embodiment showing a single item page for a retailer.

FIG. 2B is a schematic illustration of an example embodiment 210 that shows a single item page. In many embodiments, a single item page may also include other items for sale, but the single item page may include all or many details about a specific item. In many cases, a single item page may have a large image of the item, plus different properties that may not be made available on the landing page 202.

In the example of FIGS. 2A and 2B, a retailer may have a landing page 202 that displays a general category of items. Each of the items may be identified with embedded tags in the HTML defining the web page. Each of the items may also have a single item page 210 that may contain an image 212 of the item along with a detailed list of properties 214.

In some embodiments, the single item page may have properties that are not displayed or referenced in the landing page 202. In such embodiments, a crawler may start on the landing page 202 to collect some information about the items for sale, and then traverse to each single item page to collect additional properties about each item.

The single item page 210 may have additional tags for the various properties. In some embodiments, tags may be included in an HTML file for properties that may or may not be displayed in a rendered web page.

Figure 3:
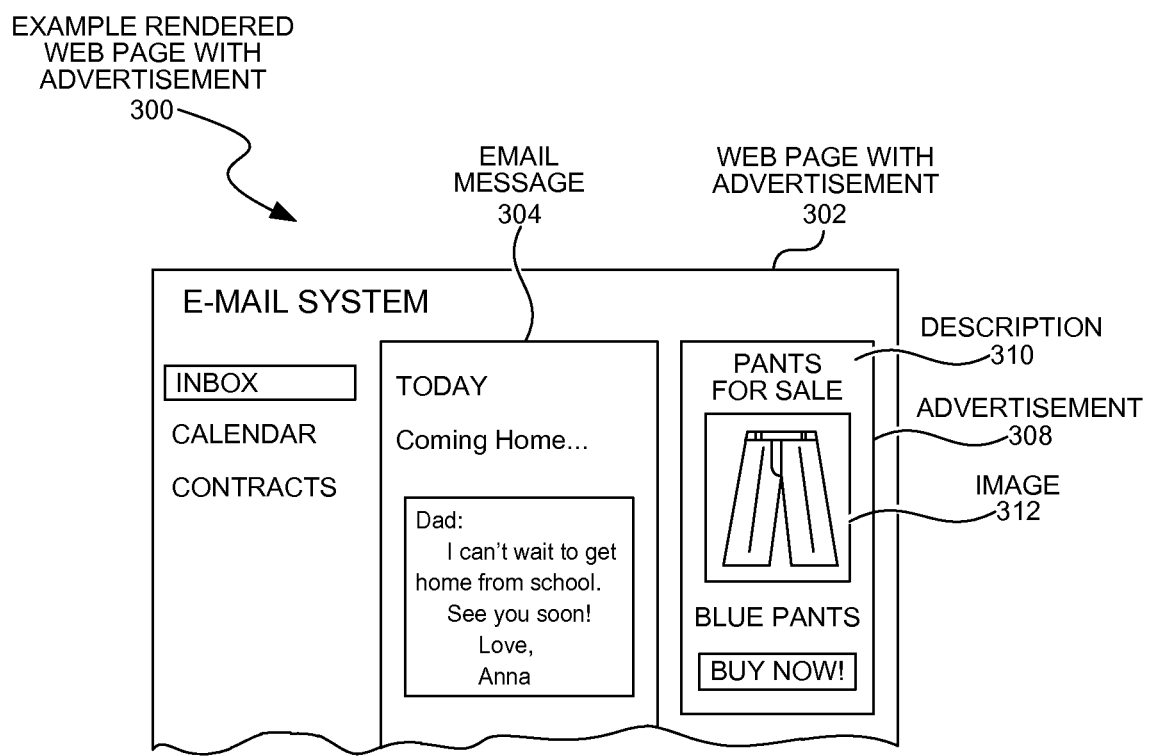
FIG. 3 is a diagram illustration an example embodiment showing a web page with an advertisement.

FIG. 3 is a schematic illustration of an example embodiment of a web page 302 with an advertisement. The web page 302 may be an application from which a user may retrieve email. Web page 302 is an example of any type of web page that may contain advertisements.

Web page 302 may display an email message 304 along with an advertisement 308. The advertisement 308 may include a description 310, image 312, and may include other information or properties of the item for sale.

The advertisement 308 may be provided by an advertisement renderer. In many website properties, a website owner may dedicate a portion of a website to advertisements. The portion may be populated by calling an advertisement renderer that may place an ad on the website. The advertisement renderer may select a specific advertisement based on the user's preferences, previous selections, searches, or other information. In some cases, the content of the website being displayed may be scanned to identify keywords, and those keywords may be transmitted to the advertisement renderer and used to select an advertisement corresponding to the keywords.

Figure 4:
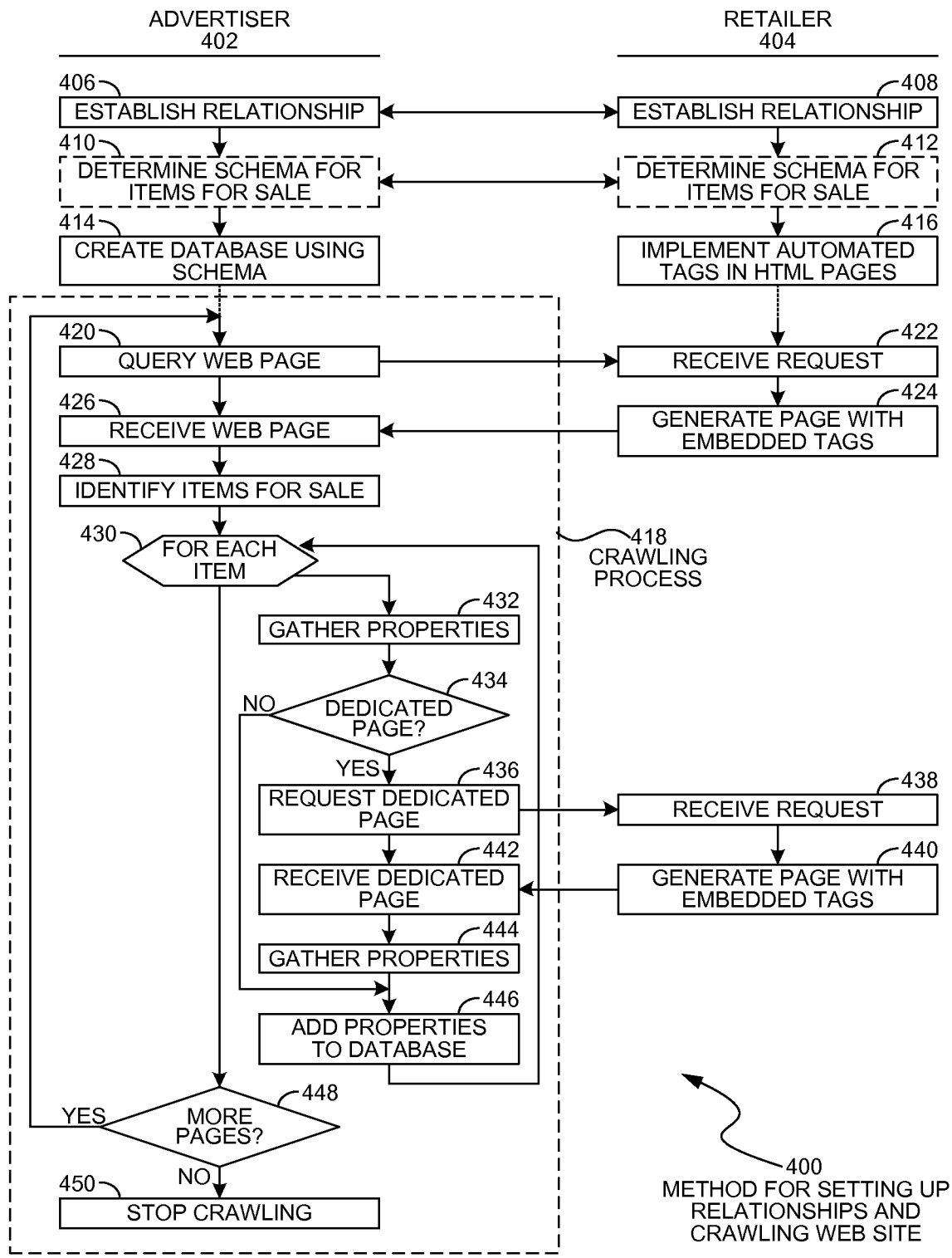
FIG. 4 is a flowchart of an embodiment showing a method for setting up relationships and crawling a retailer web site.

FIG. 4 is a flowchart illustration of an embodiment 400 showing a, method for setting up relationships and crawling a website. Embodiment 400 illustrates the operations of an advertiser 402 on the left and the operations of a retailer 404 on the right.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates one method by which an advertiser may collect information about items for sale and populate a database. The items for sale may be presented on the retailer's website as part of the retailer's normal web pages that may be served to potential customers. The advertiser may crawl the retailer's website to identify items for sale based on tags embedded in the retailer's HTML.

In blocks 406 and 408, the advertiser 402 and retailer 404 may establish a relationship. The relationship may define how and when the advertiser 402 may place advertisements for the retailer's products on various web properties. The relationship may define payment schemes, criteria for advertisements, and other factors.

In blocks 410 and 412, a schema for tagging items for sale may be defined. In some embodiments, the advertiser 402 may define the schema. In other embodiments, the retailer 404 may define the schema. In still other embodiments, the schema may be defined in part by a standards body or industry consortium.

In some embodiments, the retailer 404 may define extensions to an existing schema. For example, most products may have some generic properties, such as cost, while other products may have specialized properties. In the example of clothing above, the specialized properties may include sizes, colors, and other properties that may not be suitable to items like electronics or kitchen appliances.

Based on the schema from blocks 410 and 412, the advertiser 402 may create a database using the schema in block 414.

Also using the same schema, the retailer 404 may implement automated tags in HTML pages.

The crawling process of the advertiser 402 may be performed in block 418.

The advertiser 402 may query a web page in block 420, which may be received by the retailer 404 in block 422. The retailer 404 may generate a web page with embedded tags in block 424, which may be received in block 426 by the advertiser 402.

The advertiser 402 may identify all of the items for sale in block 428 and process each item in block 430.

For each item in block 430, properties for the item may be gathered in block 432. If there is a dedicated page for the item in block 434, the dedicated page may be requested in block 436, which may be received by the retailer 404 in block 438. The retailer 404 may generate a page with embedded tags in block 440, which may be received in block 442 by the advertiser 402. The advertiser 402 may gather additional properties in block 444 from the tagged dedicated page.

Regardless if there is a dedicated page or not, any properties collected for the item may be added to the database in block 446.

After processing all of the items in block 430, if there are any more web pages at the retailer in block 448, the process may return to block 420. If no more pages are available, the crawling process may stop in block 450.

In some embodiments, a crawling process may be performed ahead of time and the results stored in a database. Other embodiments may perform an abbreviated crawling process on demand. Such embodiments may perform a crawling process when an advertisement is requested, and such embodiments may have more up to-date data than embodiments where the crawling process is performed prior to serving an advertisement.

Figure 5:
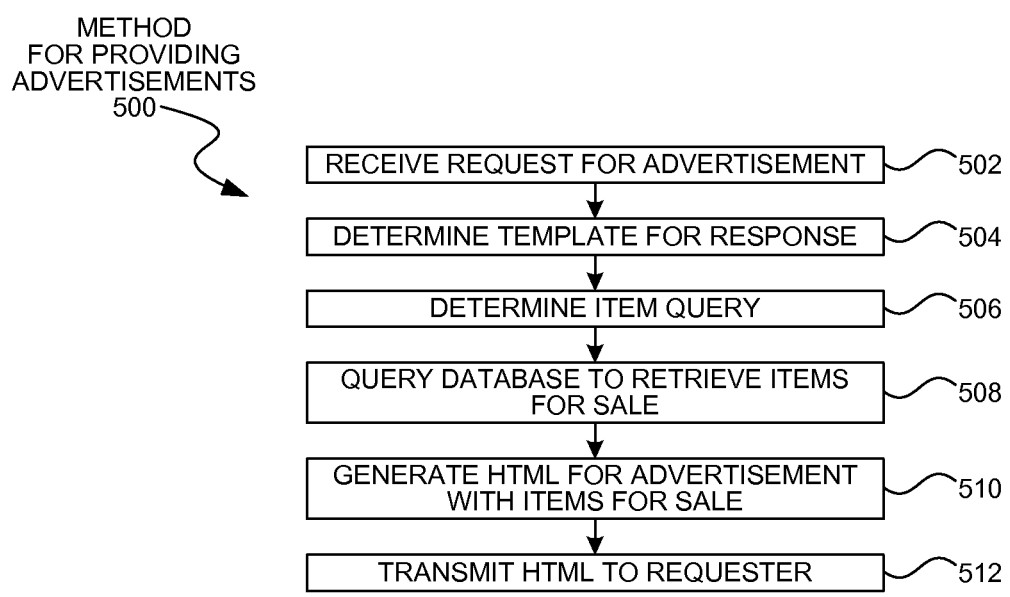
FIG. 5 is a flowchart of an embodiment showing a method for providing advertisements.

FIG. 5 is a flowchart illustration of an embodiment 500 showing a method for providing advertisements. Embodiment 500 illustrates the operations of an advertisement renderer, such as the advertisement renderer 120 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A request for an advertisement may be received in block 502. The request may include keywords or other information that may be used by the advertisement system to identify an appropriate advertisement. The request may also include a size or area that the advertisement may fill in a web page.

Based on the request, a template for the advertisement response may be selected in block 504. An item query may be created in block 506 and a database of items may be queried in block 508 to retrieve an item for sale along with whatever properties are available.

An HTML file may be generated in block 510 that include the advertisement along with items for sale and may be transmitted in block 512 to the requestor.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. An apparatus comprising:
   at least one network interface;
   a memory storing processor-executable instructions; and
   a processor operatively coupled to the at least one network interface and the memory, wherein upon execution of the processor-executable instructions, the processor:
   determines criteria of a defined relationship between an advertiser and a retailer, wherein the defined relationship includes criteria for types of advertisements and placement of advertisements to be used;
   determines a schema for tagging items for sale, the schema defining how embedded tags are implemented on the retailer's web page;
   queries the retailer's web page;
   receives a web page with embedded tags in response to the query;
   identifies one or more items on the received web page by detecting an embedded tag for each of the items;
   gathers properties relating to each of the items, the properties being identified by the embedded tags;
   adds the properties to a database;
   queries the database to retrieve one or more items for sale and one or more properties associated with each item;
   determines a template for displaying items for sale based on the criteria defined by the relationship between the advertiser and the retailer; and
   displays one or more of the retrieved items for sale on a retail web page using a layout defined by the template.

2. The apparatus of claim 1, wherein the processor further receives a request for an advertisement from a requestor.

3. The apparatus of claim 2, wherein the processor further generates a Hypertext Markup Language (HTML) file that comprises the one or more items and associated properties retrieved from the database.

4. The apparatus of claim 3, wherein the processor further transmits the HTML file to the requestor.

5. The apparatus of claim 1, wherein the processor further retrieves a color palette and text formatting information.

6. The apparatus of claim 1, wherein the processor further:
   receives another;
   retrieves at least one property for the another item from the another web page; and
   displays the another item on the retail web page.

7. The apparatus of claim 1, wherein the schema defines how the embedded tags are implemented as automated tags on the retailer's web page.

8. The apparatus of claim 1, wherein the criteria of the defined relationship further includes an indication of when advertisements may be placed.

9. The apparatus of claim 1, wherein the processor further retrieves item spacing and image information.

10. A device comprising:
    a processor; and
    executable instructions operable by the processor, the executable instructions comprising a method for crawling a retailer web page for items to advertise, the method comprising:
    determining criteria of a defined relationship between an advertiser and a retailer, wherein the defined relationship including criteria for types of advertisements and placement of advertisements to be used;
    determining a schema for tagging items for sale, the schema defining how embedded tags are implemented on the retailer's web page;
    querying the retailer's web page;
    receiving a web page with embedded tags in response to the query;
    identifying one or more items on the received web page by detecting an embedded tag for each of the items;
    gathering properties relating to each of the items, the properties being identified by the embedded tags;
    adding the properties to a database;
    receiving a request for an advertisement from a requestor;
    determining a template for displaying items for sale based on the criteria defined by the relationship between the advertiser and the retailer;
    querying the database to retrieve one or more items for sale and one or more properties associated with each item;
    generating an HTML file that comprises the one or more items for sale and the one or more properties associated with each item; and
    transmitting the HTML file to the requestor.

11. The device of claim 10, wherein determining a template comprises retrieving a color palette and text formatting information for the template.

12. The storage device of claim 10, wherein determining a template comprises retrieving item spacing and image information.

13. The storage device of claim 10, wherein the schema defines how the embedded tags are implemented as automated tags on the retailer's web page.

14. The storage device of claim 10, wherein the criteria of the defined relationship further includes an indication of when advertisements may be placed.

15. A system comprising:
    a computing device; and
    a computer program comprising an advertising module that is executable by the computing device, the advertising module comprising:
    a crawler that crawls a retailer's web site to identify one or more items to be advertised by an advertiser as defined by criteria agreed upon by a defined relationship between the advertiser and the retailer, the one or more items identified by embedded tags on the retailer's web site, the tags defined by a schema implemented by the retailer as agreed upon between the retailer and the advertiser, each tag including one or more properties relating to a corresponding item for sale;
    a database that stores the identified one or more items from the retailer's web site and the one or more properties associated with the one or more items; and
    a renderer that receives a request for an advertisement, retrieves one or more items for sale and one or more properties associated with each item from the database, formats the properties for the one or more items for sale, and displays the one or more items for sale on a retail web page using a template based on the criteria defined by the relationship between the advertiser and the retailer.

16. The system of claim 15, wherein the criteria of the defined relationship further includes criteria for types of advertisements to be used.

17. The system of claim 15, wherein the crawler further crawls a second retailer web site and retrieves at least one property for at least one item from the second retailer web site, and wherein the renderer displays the at least one property for the at least one item from the second retailer web site on the retail web page.

18. The system of claim 15, wherein the crawler further retrieves item spacing and image information.

19. The system of claim 15, wherein the crawler further retrieves a color palette and text formatting information.

20. The system of claim 15, wherein the criteria of the defined relationship further includes an indication of when advertisements may be placed.

\* \* \* \* \*